United States Patent [19]

Nagyszalanczy

[11] Patent Number: 4,832,709
[45] Date of Patent: May 23, 1989

[54] ROTARY SEPARATOR WITH A BLADELESS INTERMEDIATE PORTION

[75] Inventor: Lorant Nagyszalanczy, Sherman Oaks, Calif.

[73] Assignee: Allied Signal, Inc., Morris Township, Morris County, N.J.

[21] Appl. No.: 485,553

[22] Filed: Apr. 15, 1983

[51] Int. Cl.⁴ ............................................. B01D 45/12
[52] U.S. Cl. ............................................. 55/1; 55/52; 55/199; 55/398; 55/404; 55/408
[58] Field of Search ..................... 55/1, 392, 394, 396, 55/398, 400, 404, 401, 406-408, 52, 199; 210/787, 380.1, 512.3

[56] References Cited

U.S. PATENT DOCUMENTS

| | | |
|---|---|---|
| Re. 20,885 | 10/1938 | Kopsa . |
| 1,447,554 | 3/1923 | Jones .................. 55/396 X |
| 1,530,825 | 3/1925 | Grimes . |
| 1,685,006 | 9/1928 | Schultz . |
| 2,197,120 | 4/1940 | Bergmann ............... 55/408 |
| 2,335,420 | 11/1943 | Jones . |
| 2,441,631 | 5/1948 | Hills ..................... 55/404 X |
| 2,897,917 | 8/1959 | Hunter . |
| 3,107,988 | 10/1963 | Taylor et al. . |
| 3,444,672 | 5/1969 | Alsobrooks . |
| 3,486,314 | 12/1969 | Herrington ............. 55/408 |
| 3,616,616 | 11/1971 | Flatt . |
| 3,785,128 | 1/1974 | Redemann . |
| 3,877,905 | 4/1975 | Novak . |
| 3,877,906 | 4/1975 | Peterson . |
| 3,944,380 | 3/1976 | Kampe . |
| 3,973,937 | 8/1976 | Petersen . |
| 4,135,897 | 1/1979 | Gondek . |
| 4,323,369 | 4/1982 | Monson et al. ......... 55/396 X |

FOREIGN PATENT DOCUMENTS

| | | | |
|---|---|---|---|
| 937681 | 8/1948 | France ................. 55/404 |
| 584875 | 12/1977 | U.S.S.R. ............... 55/406 |

Primary Examiner—Charles Hart
Attorney, Agent, or Firm—Leslie S. Miller; James W. McFarland

[57] ABSTRACT

A high speed rotary filter device is disclosed which utilizes a rotor having a bladeless portion between the inducer and the exducer portions of the rotor, thereby substantially eliminating secondary flow within the high speed rotary filter device.

7 Claims, 4 Drawing Sheets

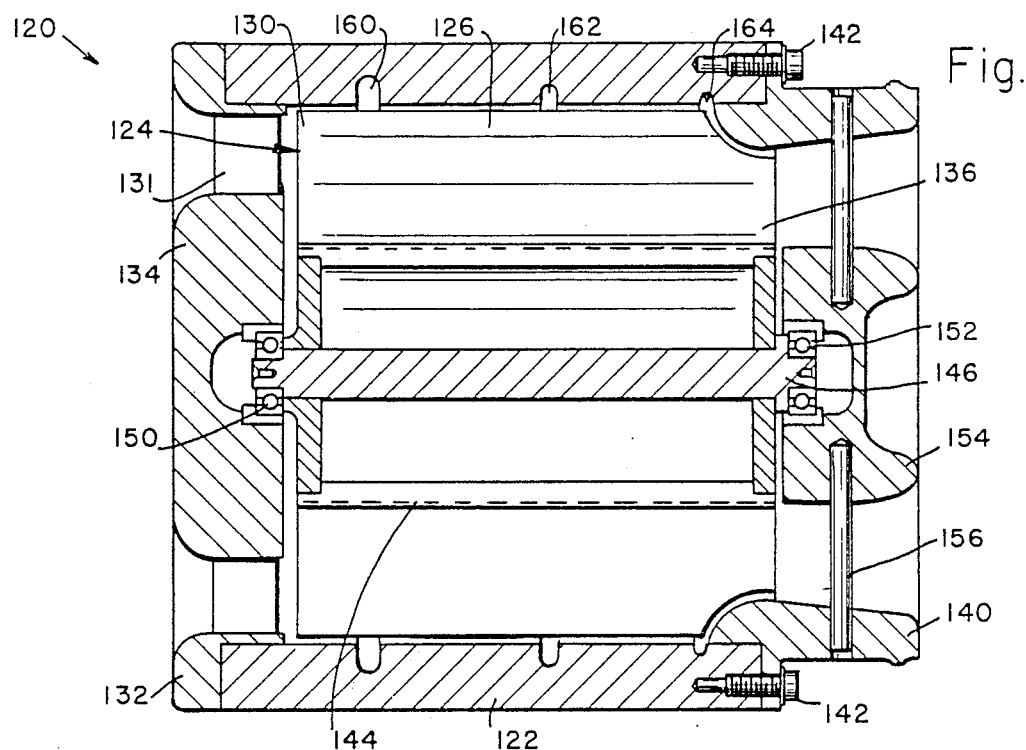
Fig. 4.
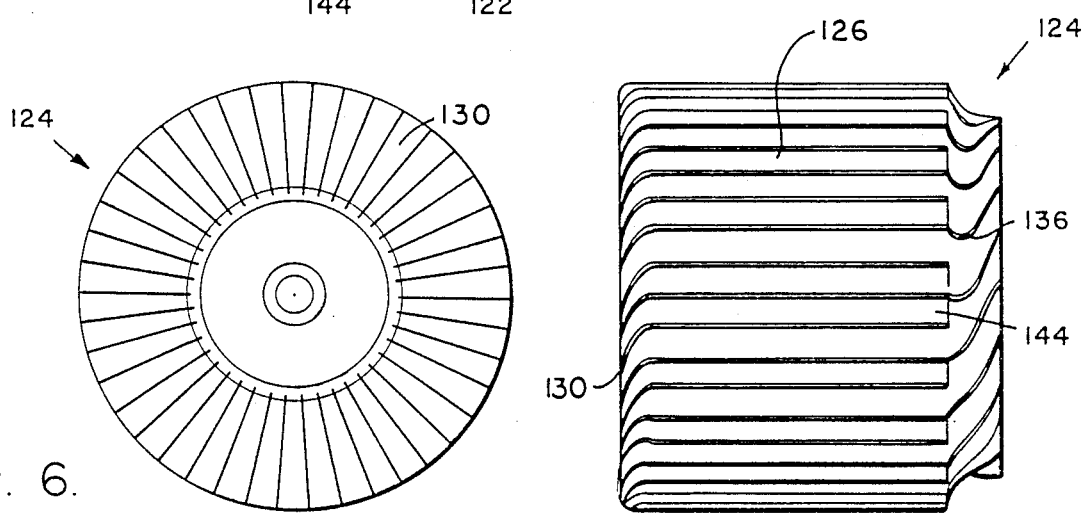
Fig. 6.
Fig. 5.
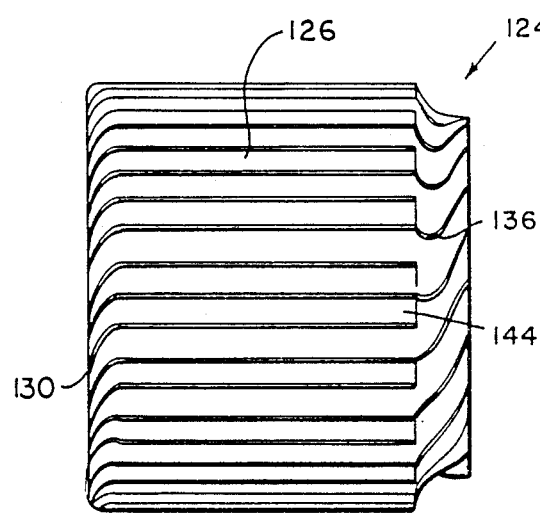
Fig. 7.

ROTARY SEPARATOR WITH A BLADELESS INTERMEDIATE PORTION

RELATED APPLICATIONS

This specification is one of a group of specifications on aerodynamic particle separator technology, all of which are assigned to the present assignee, including: Rotary Separator for Removing Particulates Suspended in a Gaseous Medium, Ser. No. 485,552, by Lee R. Woodworth and Lorant Nagyszalanczy; Discard Removing Channel for a Self-Purging Rotary Separator, Ser. No. 485,160, by Lorant Nagyszalanczy; and Rotary Separator with a Porous Shroud, Ser. No. 485,156, by Lee R. Woodworth and Beb H. Rowlett, all of which were filed concurrently with this specification.

BACKGROUND OF THE INVENTION

Filters and particle separators for removing very small particulates from gaseous suspension are fairly well known in the art today. Although these devices work quite well under ideal laboratory test conditions, they all possess one major shortcoming when used in commercial, industrial, or military applications: when the airstream to be cleaned contains particles varying in size from 1 or 2 microns (the smallest particle visible to the naked eye is approximately 20 microns in diameter) up to several hundred microns, conventional interception or barrier type filters capable of removing the smaller particles will be quickly plugged by the larger particles contained in the air stream, quickly clogging the filter and necessitating its replacement or cleaning after only a very short period of operation.

An even worse case would occur when the airstream to be cleaned originated from an environment containing larger particles such as sand; such an environment would be mandated, for example, for a military vehicle capable of being operated in a desert environment. In such an environment, particle size can range up to a 2 millimeter diameter and down to as small as a 2 micron diameter, and it can be seen that under such circumstances the larger sand particle would quickly destroy a conventional filter, disabling the vehicle.

Devices for removing particles from an air stream are of five baic types: viscous impingement filters, electrostatic precipitators, dry interception or barrier filters, cyclone or vortex inertial separators, and a combination of an inertial separator and a barrier filter. A viscous impingement filter is made of a relatively loosely arranged filter medium, usually spun glass fibers, the surfaces of which are coated with an adhesive such as oil. Solid particles are thrown against the adhesive surface as the airstream passes through the filter, and are trapped in the filter. Viscous impingement filters are useless in removing smaller particles, since smaller particles tend to follow the path of the airstream through the filter, and thus are not removed from the airstream.

The second type of filter is the electrostatic precipitator, which passes the air stream through an ionized field which imposes an electrical charge on particles in the airstream. The ionized particles are then passed between a charged plate and a grounded plate, and are precipitated on to the grounded plate. Such electronic air cleaners possess many disadvantages, including their large size and awkward shape, severe limitations on the airflow which can be passed through a precipitator sized to be carried on a vehicle, the requirement of very high voltage power supplies, fairly high unit cost, and the necessity for frequent cleaning of the filter. Electronic precipitators thus are not practical for any use other than that in a stationary location.

The third type of device, the dry interception or barrier type filter, is by far the most common and the most economical particle separation device available. Barrier filters utilize a filter medium, such as spun glass fiber, which has a very fine filter diameter and a close weave to remove very small particles. While barrier filters are extremely efficient in the removal of very small particulates from an airstream, their efficiency is dependent on the absence of even a small number of somewhat larger particles. If such larger particles are present in the airstream, the barrier filter will become clogged very rapidly, necessitating replacement far too frequently to be practical.

Thus, it can be seen that in a barrier filter, two opposing considerations are present: first, it is desirable to make the filter highly efficient (close weave) in order to remove smaller particles in the airstream; on the other hand, the barrier filter must be made somewhat less efficient (wide weave) in order to prevent it from becoming clogged too quickly. These opposing considerations are irreconcilable in an airstream containing a variety of sizes of particles from which both large and small particles must be removed.

The fourth type of device widely used is the cyclone or vortex inertial separator, which operates on the principle that particles suspended in an airstream have greater inertia than the gas itself. The gas typically enters the separation chamber tangentially and leaves in an axial direction, although it is swirling at high speed in the chamber. Since the particles have a greater inertia than the gas, they are flung to the outer wall of the separator, from which they exit the device.

In a cyclone separator the gas is impelled into the separator with a high velocity. An alternate method uses a rotating member to induce the rotation of the airstream in the device.

Several mechanical devices operating on this principle have been manufactured, and are felt worthy of specific mention herein. U.S. Pat. No. 3,944,380, to Kampe, and assigned to the assignee of the present invention, is perhaps the best example of such a device. The Kampe patent discloses a nozzle for extracting dirt particles introduced into a radial inflow turbine. While the Kampe device is a highly efficient and useful device, it is virtually completely incapable of removing particles smaller than 10 microns, a limitation which is specifically cited in the specification. Other such devices are disclosed in U.S. Pat. Nos. 3,444,672, to Alsobrooks, and in 3,616,616, to Flatt, but these devices are also incapable of removing small particulates from the airstream, and are not designed to remove small particles from an airstream. The function of all three of the above-disclosed devices is to remove from the airstream particles which are large enough to present a serious erosion problem on high speed portions of jet turbine engines. Particles smaller than 10 microns need not be removed, because such particles do not present a serious erosion problem to high-speed metal surfaces, and thus do not present a premature wear threat to the devices.

Numerous other mechanical devices to separate particulates from an airstream are known in the art, but are of such a primitive state as to not merit specific mention herein.

Not only are cyclone or vortex inertial separators useless for removing small particles from an airstream, but they are generally of a fairly large size, weight, and cost, which, when weighed with their low efficiency in removal of small particles, dictates against their use.

The fifth type of apparatus used for particulate removal is a combination of an inertial separator and a barrier filter. Unfortunately, such a combination, rather than presenting the advantages of both the inertial separator and the barrier filter, presents the disadvantages of both without the advantages of either. Since inertial separators are incapable of removing particles below 10 microns diameter from the airstream, these particles will pass through the inertial separator to the barrier filter. If the barrier filter is sized to remove particles as small as 2 microns diameter, it will become clogged by the particles of up to 10 micron diameter only slightly less quickly than if the airstream was not passed through the inertial separator at all. Therefore, the combination system will have not only the disadvantage of requiring frequent barrier filter replccement, but it will also have the disadvantage of the large size, weight, and cost of the inertial separator. Such a system would not be feasible in any but a stationary location.

Therefore, it can be seen that there are not existing filter or separator arrangements in the art which are capable of removing very small particulate matter suspended in a gaseous medium, which are also capable of removing larger particles from the gaseous medium and are available for use over extended periods of time without requiring shutdown to replace or clean filters. There exists today an urgent need for such a device, particularly in several vehicular applications.

The most obvious vehicular application of such a device is to remove particles from the airstream used to supply a motor vehicle operating in a dusty environment. While general commercial and industrial motor vehicles have generally adequate filter systems available, military vehicles which are designed to operate in an extremely dusty environment, such as in a desert field of operation, have as an essential requirement a particle separation system which can remove virtually all particulate matter from the engine air supply. It is obvious that such a military vehicle may not use a conventional barrier filter which will have to be replaced, since such replacement during field operations would be either impractical or impossible, since the vehicle would not be able to carry a sufficient supply of spare filters. In addition, it is extremely undesirable to have a military vehille which would require frequent maintenance such as a changing of the engine air filter.

An additional, and highly important, military utilization for a particle separator capable of removing very small as well as larger particles from the air is in the cabin ventilation system of a sealed military vehicle. It is obvious that a military vehicle operating in a dusty or sandy environment will need a special ventilation system to supply the crew of the vehicle with an adequate supply of fresh air to breathe. Another reason mandating the separation of very small particles from the crew air supply is the possibility that such a military vehicle may be called upon to operate in a post-nuclear environment. The primary carrier of radiation in such a post-nuclear environment are particles of dust, and conventional devices of the type described above don't get small particles out of the air supply. Such small particles, if they were included in the air supplied by a cabin ventilation system to the crew of the vehicle, would contaminate the cabin rapidly, causing radiation sickness and possible death to the crew members. Therefore, the particle separation device for such a cabin ventilation system must be capable of removing very small dust particles from the air circulated to the crew environment.

There are several possible commercial and industrial applications for a device capable of removing small as well as large particulate matter from a gaseous medium. The best example of such a requirement is in the exhaust system of a motor vehicle. Two particular environmental problems today are diesel soot from the exhaust of diesel engine vehicles, and lead particles from gasoline engines burning leaded gasoline. A conventional system would be useless in removing such particulates, since the device must not only be relatively small to be conveniently installed on the vehicle, but must be highly resistant to clogging over extended periods of time. There exists no particle separation device known today which is capable of lasting for an extended time in the exhaust system of a motor vehicle.

Therefore, it can be seen that it is highly desirable to construct a device which is capable of removing particulate matter ranging in size from sand particles to very tiny dust particles as small as approximately 2 microns from an airstream. It is desirable that such a device be utilizable as an engine intake air cleaner, removing particulate matter from the airstream supplied to a vehicle operating in a dirty, dusty, or sandy environment. Such a device must be capable of removing very fine dust particles from the environmental air intake supplying air to the crew of a vehicle; extremely small dust particles must be removed in such an application, since such dust particles are primary carriers of radiation contamination. Such a device may also be capable of removing lead or carbon particles from the exhaust stream from a vehicular engine, lasting for extended periods of time without maintenance.

A further requirement of such a device is that it be self-cleaning, that it need no replacement or cleaning of a filter element, and that it need only minimal maintenance and repair service over extended periods of use in hostile environments, including a desert environment and the exhaust stream of an internal combustion engine.

Since such a device may either be used in an application in which there may be an air pressure drop across it (such as in the intake system or in the exhaust system of an engine) or in an application where there is no inherent air pressure drop across the device (such as in an environmental ventilation system supplying air to a sealed cabin), it is desirable that the device operate in either a powered manner or that it be capable of being driven by the pressure drop across the device. The powered device should be driven by a small, efficient motor, such as a self-contained electric motor. The pressurized device may be driven by the pressure drop, and therefore must contain some type of driving means such as the turbine wheel in a turbocharger. The device must also be of minimal size, weight, and cost, since it may be utilized on vehicles as small as a commercially available passenger car. It must also be a bolt-on device, so it is necessary that the device be entirely self-contained.

Since the device is to be self-cleaning, and not requiring replacement or cleaning of a filter element, it must somehow scavenge the particles removed from the airflow, the particles being removed from the device to a collection area. In some applications, it must further scavenge to atmospheric pressure, even though the output of the device may be at less than atmospheric pressure. In the removal of the particles from the airflow, it is highly desirable that as little of the airflow as possible be used for purging the particles from the device, to make the device as efficient as possible.

A final desirable feature of such a device is that it inhibit the breakup of particles into smaller particles caused by the dynamic operation of the device. In order to do this, the particles contained in the airflow must be removed from the device as quickly as possible, and any secondary airflows within the device must be minimized or eliminated to prevent patticles from bouncing around and breaking up within the device.

SUMMARY OF THE INVENTION

The invention is a high speed rotary particle separator of a unique design which renders the device capable of separating both large and very small particles from an airstream passing through the device. The device is fully capable of removing particulate matter ranging in size from grains of sand all the way down to particles only 2 microns in diameter, over 99% of the latter particles being removed from the airstream. In one embodiment of the rotary particle separator, the outlet volume airflow from the device permitted is over 2,000 times the volume of the device itself; the impact of this figure is that the airflow volume required for any particular application may be achieved using a device much smaller than barrier filters, cyclone or vortex inertial separators, or any combination thereof, and in addition the device achieves an efficiency of a magnitude of one or two times greater than was possible using such previously known devices.

The rotary particle separator is constructed in one of two basic embodiments: either powered by some type of drive means, or turbo-driven by a pressure drop across the device such as would be found if the device was used as an intake or exhaust particle separator for an engine. The powered version may be driven by an electric motor contained in the device itself, or by driving a shaft extending from one end of the device.

Even with such outstanding performance characteristics, the rotary particle separator boasts an exceedingly simple construction, since it is basically a rotor contained within a housing. The rotor itself is cylindrical in shape, with inducer blades at the inlet end of the rotor and exducer blades at the outlet end of the rotor, both of which cause the air to flow through the device and over the rotor. Three embodiments for the portion of the rotor between the inducer blades and the exducer blades are disclosed, including a first embodiment which has a number of axially extending blades around the outer circumference of the rotor between the inducer and exducer blades, a second embodiment which has a smooth surface rather than blades between the inducer and exducer blades, and a third embodiment which has a number of axially extending blades similar to the first embodiment, but which are covered by a porous shooud. Both the second and third embodiments seek to overcome secondary airflow which may be experienced in the first embodiment, reducing efficiency in that embodiment.

A variety of different geometrical arrangements for the inducer blades are disclosed, including a radial outflow arrangement where the airflow is drawn into the device near the axis of the device and is then forced outward to the outer circumference of the device, where the axial blades are located. A second geometrical arrangement is the axial flow inducer, where the air flows from an inlet adjoining the circumference of the rotor through the inducer blades and into the axially extending blades on the rotor. A third type of inducer blade geometry disclosed is a combination of the first two, and is appropriately called a mixed flow inducer. Depending on the relative mix of large and small particles in the air flow to be filtered, one of these inducer geometries may be more desirable than the others.

The second main portion of the rotary particle separator is the housing which surrounds the rotor, leaving only a small space between the housing and the rotor. When the rotor turns at high speed, air flow will be present through the axially extending blades, and due to the high rotational speed, particles will be forced radially away from the axis of the rotor, toward the housing. Accordingly, the inside surface of the housing has several small grooves, which, in the preferred embodiment are located in a plane which is perpendicular to the axis of the rotor, which grooves are called discard removing channels and are used for collecting particles which are forced outwardly away from the rotor by the high speed rotation. Alternately, the channels may be axially located on the inside surface of the housing. Each of these discard removing channels has one or more exits from the housing, through which the particles are removed.

Several embodiments for particular discard removing channel geometry are proposed, which are novel in that they require only a very small amount of air flow from the main air stream to scavenge the particles from the device. One such configuration is the tangential discard removing channel, which runs the circumference of the interior of the housing at a uniform depth, has one or more points of egress from the interior of the housing through which particles are ejected from the housing. A second type of discard removing channel is the scroll type channel, which increases in depth in the housing as it approaches the point at which the particles are removed from the housing of the device. An additional refinement disclosed is the use of a diffuser at the outflow points to further reduce the amount of air required to be diverted from the main airflow to scavenge the particles from the device.

The highlight of the disclosed configurations for discard removing channels is that they use only minimal air flow to remove the particles from the device. This removal may be seen as a self-cleaning or self-purging of the device, eliminating the necessity to clean the device or change filters, both of which are limitations on formerly existing devices.

Thus, it can be seen that the rotary particle separator. disclosed in the present specification offers tremendous advantanges over the devices predating the present invention. The rotary particle separator disclosed herein removes both large and small particles from an airstream, while not requiring repair, cleaning, or replacement of a filter element at regular intervals. The device is of minimal size and weight, and due to its design simplicity, its cost is fairly economical, particularly when viewed with its much improved performance over preexisting devices.

The device is either internally powered, driven by connection to a shaft extending from the device, or driven by a pressure drop across the device, the last of which embodiments was completely unknown in the art. The device is entirely self-contained, and is designed so as to be a bolt-on fixture.

Only a very small amount of the air stream flowing through the device is used as scavenging air to remove particulates from the device to a collection area, thus insuring that the high volume of air flow through the device will not be diminished by a large scavenging air volume requirement.

The device also has means to prevent particulate breakup and secondary flow of particles causing such particulate breakup, thus further increasing the efficiency in the removal of all particulate matter down to approximately 2 micron diameter.

Thus, the device disclosed herein accomplishes objectives impossible for previously existing devices to perform, such as removal of both large particles such as sand and small particles such as extremely fine dust from the air intake for an engine, or possible application in the removal of lead particles or carbon particles from the engine exhaust of a gasoline engine or a diesel engine, respectively. The present invention is also highly useful as an environmental intake particle separator to a sealed crew cabin in a military vehicle operating in desert-type conditions, since it will not only remove larger particulate matter, but will also remove small dust particles which are a primary carrier of radiation in a post-nuclear enviornment. A further application of the present invention is to remove heavies and particles from a liquid flowing through the device, the characteristics of the invention allowing for greater efficiency in the removal of small particles than that of a centrifuge.

Thus, it can be seen that the present invention represents a vast improvement in the particulate separator and filter art, and achieves greatly improved performance characteristics in a more economical and easily utilizable manner.

DESCRIPTION OF THE DRAWINGS

These and other advantages of the present invention are best illustrated through reference to the drawings, in which:

FIG. 4 is the turbo-driven embodiment of the present invention with axial inducer geometry;

FIG. 5 is a side view of the rotor of the device shown in FIG. 4;

FIG. 6 is the inducer end view of the rotor shown in FIGS. 4 and 5;

FIG. 7 is an alternate embodiment of the present invention showing mixed inflow inducer geometry, and an increasing diameter axial rotor blade design;

DETAILED DESCRIPTION OF THE PREFERRED EMBODIMENT

Figure 1:
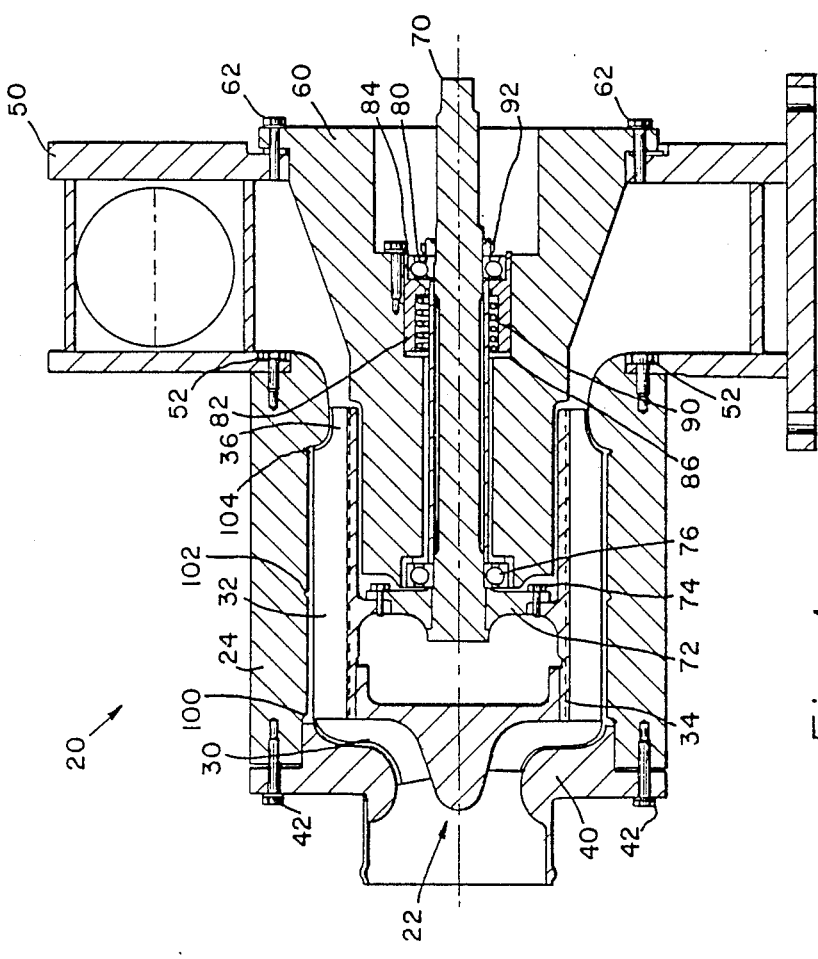
FIG. 1 is a cutaway drawing showing the invention in a powered embodiment driven by a shaft, and featuring radial outflow inducer geometry and a rotor with axially extending blades.

A shaft-driven rotary particle separator 20 embodying the principles of the present invention is shown in FIG. 1. The two principal components of the particle separator 20 are a rotor 22 and a housing 24.

Figure 3:
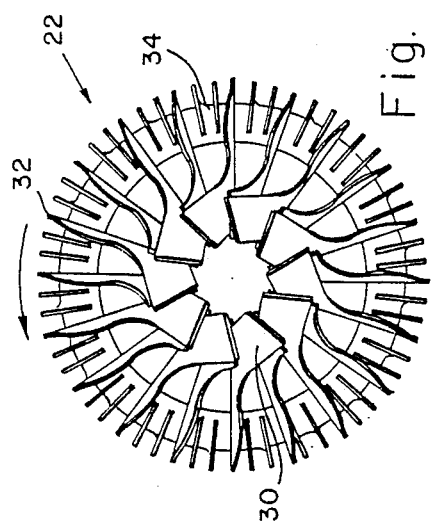
FIG. 3 is the inducer end view of the rotor shown in FIGS. 1 and 2.
Figure 2:
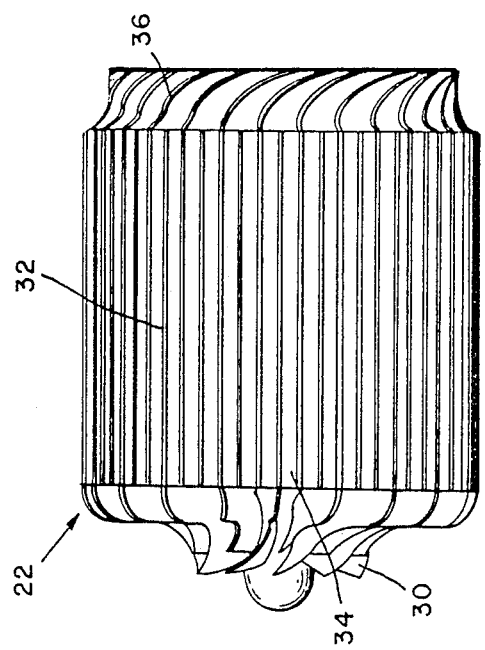
FIG. 2 is a side view of the rotor of the device shown in FIG. 1.

The rotor 22, best shown in FIGS. 2 and 3, is basically cylindrical, and is designed to rotate about the axis of the cylinder. The rotor 22 may be subdivided into three portions: an inlet portion, a separator portion, and an outlet.portion. The inlet portion consists of a number of inducer blades 30, shown to the left end of the rotor 22 in FIGS. 1 and 2, and shown in the end view of FIG. 3. The inducer blades 30 act to draw the airstream to be cleaned into the particle separator 20.

The inducer blades 30 shown in FIGS. 1, 2, and 3 are arranged in a radial outflow configuration. What this means is that the airflow is drawn into the particle separator 20 near the center of the rotor 22, and then flows radially outward through the paths defined by the inducer blades 30 to reach the separator portion of the rotor 22, as best shown in FIG. 1. Two other possible configurations for the inlet portion of the rotor 22 will be discussed later.

The separator portion of the rotor 22 consists in the primary embodiment of a number of axially arranged outwardly extending rotor blades 32 extending from a cylindrical rotor body portion 34. The airstream within the filter device 20 will travel essentially between the rotor blades 32 longitudinally from left to right in FIGS. 1 and 2. Since during the time that the airstream is flowing from the inlet end of the rotor 22 toward the outlet end of the rotor 22 in the area between the rotor blades 32 and the interior surface of the housing 24, the rotor 22 is rotating at a fairly high speed, particles present in the airstream will be driven in a direction radially outward from the rotor 22, since their relative weight is greater than that of the gaseous airstream.

The outlet portion of the rotor 22 consists of a number of exducer blades 36, which will remove a large part of the rotational energy imparted to the airstream by the inducer blades 30 and the rotor blades 32. It may be noted that while the figures show specific numbers of inducer blades 30, rotor blades 32, and exducer blades 36, this should in no way imply that the present invention is limited to the specific blade configurations shown, which are specific examples.

The second basic component of the rotary particle separator 20 is the housing 24, which serves two basic purposes: first, to rotatably support the rotor 22 via additional necessary hardware, and second, to closely surround the inducer blades 30, the rotor blades 32, and the exducer blades 36 of the rotor 22. By closely surrounding all three bladed portions of the rotor 22, the housing essentially confines movement of the airstream through the particle separator 20 to the areas within the bladed portions of the rotor 22. In addition to the main housing portion 24 which surrounds the rotor blades 32 and the exducer blades 36, an inlet shroud 40 surrounds the inducer blades 30, ensuring that the airstream travels primarily between the inducer blades 30 when flowing through the particle separator 20. The inlet shroud 40 is bolted to the main housing 24 by a number of bolts 42 around the perimeter of the inlet shroud 40.

Upon leaving the rotor 22 through the exducer blades 36, the airstream may still have some rotational energy not removed by the exducer blades 36, and will be channeled out of the particle separator 20 through a scroll assembly 50 which is bolted on to the main housing portion 24 by a number of bolts 52. The scroll assembly, which in the embodiment shown in FIG. 1 is of a diameter larger than the diameter of the rotor 22 and the main housing 24, has a single tangential outlet for the airstream passing through the particle separator 20. As will be apparent in discussion of additional figures included in the specification, the configuration of the scroll assembly 50 is only one of a number of possible configurations by which the airstream may exit the particle separator 20, and, in fact, is more useful in a stationery location application than in a vehicular application, the latter of which is the primary concern herein.

The rotor 22 is rotatably mounted on a shaft carrier housing 60, which, in turn, is mounted to the scroll assembly 50 by a number of bolts 62 extending circumferentially around the shaft carrier housing 60. Thus, it may be seen that the shaft carrier housing 60 extends into the particle separator 20 from the outlet end adjacent the scroll assembly 50, and actually is within a portion of the cylindrical rotor body 34.

A shaft 70 extending through the shaft carrier housing 60 into the interior of the cylindrical rotor body 34 is press fitted on to a shaft carrier flange 72, which, in turn, is bolted onto the cylindrical rotor body 34 by a number of bolts 74 extending circumferentially around the shaft carrier flange 72. A bearing assembly 76 is mounted into the end of the shaft carrier housing 60 adjacent the shaft carrier flange 72, and rotatably supports the end of the shaft 70 attached to the rotor 22.

The driving end of the shaft 70 which extends out of the outlet end of the particle separator 20 is supported by a second bearing assembly 80, which is mounted within a bearing preload sleeve 82 slidably mounted in the outlet end of the shaft carrier housing 60, and retained within the shaft carrier housing 60 by a retaining bolt 84. Mounted within the bearing preload sleeve 82 and acting on the shaft carrier housing 60 through a number of shims 86 is a spring 90, which tends to urge the rotor 22 onto the shaft carrier housing 60. Tension in the spring 90 is adjusted by a retaining nut 92 mounted on the shaft 70 and causing the bearing preload sleeve 82 to be adjusted within the shaft carrier housing 60. Thus, by driving the shaft 70, the rotor 22 is caused to rotate within the particle separator 20. Of course, the mounting arrangement used in FIG. 1 to rotatably mount the rotor 22 within the particle separator 20 is only one arrangement which has been found to be acceptable.

OPERATION OF THE DEVICE

When the shaft 70 is driven causing the rotor 22 to rotate at high speed, the inducer blades 30 will draw the contaminated airstream into the particle separator 20. The airstream will move from the inducer blades 30 to the rotor blades 32, which are moving at high speed relative to the main housing 24 adjacent the edges of the rotor blades 32. The airstream between the rotor blades 32 contains particles which will tend to be thrown outward due to the centrifugal force caused by the high speed rotation of the rotor 22. Therefore, it can be seen that most of the particulate matter in the airstream will be swirling near the main housing 24, at which location it can be removed from the filter device 20.

Three discard removing channels 100, 102, and 104 are located in the main housing 24. These discard removing channels 100, 102, and 104 are basically grooves which are machined into the main housing 24, and which therefore are of a slightly greater diameter than the rest of the portion of the main housing 24 adjacent the rotor blades 32. Since the diameter of the discard removing channels 100, 102, and 104 is greater than is any other portion of the main housing 24 adjacent the rotor blades 32, particulate matter, which is heavier than the gaseous medium in which it is suspended, will tend to be thrown outward into these discard removing channels 100, 102, 104, and will circulate hherein.

Figure 8:
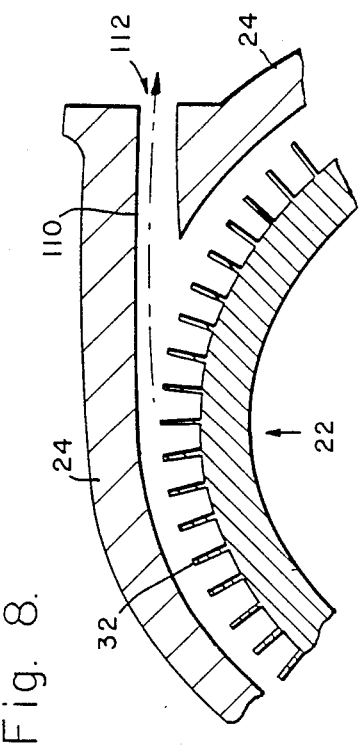
FIG. 8 is a partial cross-sectional view of the invention showing the tangential discard removing channel design.

At some portion in the circumference of the main housing 24 and one of the discard removing channels 100, 102, and 104, the particulate matter circulating in the discard channels 100, 102, and 104 will be removed from the particle separator 20 through one or more apertures in the housing 24 known as discard channels. One possible arrangement for this particulate removal is shown in FIG. 8, which is a partial cross-sectional view of one of the discard removing channels 100, 102, and 104. The particular discard removing channels shown in FIG. 8 is a tangential discard channel 110, so named because particulate matter exiting the particle separator 20 through the tangential discard channel 110 leaves in a scavenging outflow 112 tangential to the path of the rotor blades 32. Since the actual size of the tangential discard channel 110 is fairly small, only a small amount of gas from the airstream is required to carry the particulate matter through the tangential discard channel 110 out of the particle separator 20. This aspect of the invention, and other possible configurations for the discard removing channels 100, 102, and 104 will be discussed later. Also, it should be noted that the discard removing channels may be machined axially into the interior of the housing, with small holes in the axial channels allowing the particles to exit the device.

Returning to FIG. 1, it can be seen that the discard removing channel 100 is larger than the discard removing channels 102 and 104. The reason for this is that the larger particles will be removed at the first discard removing channel 100, since they will immediately move to the outside of the flow path between the rotor blades 32 and the main housing 24. In fact, virtually all particles above a 10 micron diameter will be removed at the first discard removing channel 100. The smaller particles will be removed mainly at the second and third discard removing channels 102 and 104.

In order to remove virtually all particles down to a size of 1 to 2 microns, a sufficient amount of centrifugal force must be applied to particles suspended in the airstream. It will be immediately recognized that the centrifugal force is dependent upon the speed and the diameter of the rotor 22. Even with rotor diameters less than one foot, the filter device may be constructed using present high speed technology that will result in the desired efficiency. Therefore, it can be seen that the particle separator 20 is considerably more compact than cyclone or vortex type inertial separators.

Moving to FIG. 4, a particle separator 120 is shown which operates on the pressure drop between the inlet end and the outlet end of the particle separator 120. A housing 122 surrounds a rotor 124 in a manner very similar to the principles explained above with reference to the particle separator shown in FIG. 1. The rotor 124 has a number of rotor blades 126 with each of the rotor blades 126 having an axial flow inducer blade portion 130. By axial flow it is meant that the airstream enters the device basically in a straight line rather than entering near the center of the rotor and moving radially outward to reach the blades, as it did in the device of FIG. 1.

For the particle separator 120 shown in FIG. 4, the air stream enters through inlet vanes 131 mounted between an inlet shroud 132 which is attached to the main housing 122, and a shaft carrier assembly 134. The airstream will flow through the inducer blade portion 130 and between the rotor blades 126, will exit the rotor 124 through an exducer blade portion 136, and will leave the particle separator 120 through an oulet shroud 140, which is bolted onto the housing 122 by a number of bolts 142 extending circumferentially around the perimeter of the outlet shroud 140.

The rotor 124 consists of the rotor blades 126 which are mounted on a rotor body 144, which is in turn mounted onto a shaft 146. The inlet end of the rotor 124 and the shaft 146 are supported by a bearing assembly 150, which is mounted in the shaft carrier assembly 134. The outlet end of the rotor 124 and the shaft 146 are rotatably mounted in a second bearing assembly 152, which is supported by a support assembly portion 154 connected by a number of shaft carrier bars 156 to the outlet shroud 140. Thus, it can be seen that the rotor 124 will turn freely within the housing 122.

FIGS. 5 and 6 show the rotor 124, which is particularly designed to operate with a pressure drop of approximately 10 inches $H_2O$ while removing virtually all particles down to a size of between 1 and 2 microns. This performance is achieved in a package with an overall diameter of approximately nine inches. The particle separator 120 may thus be operated in the intake system or exhaust system of a motor, and will be operated by the vacuum of the intake or pressure of the exhaust. Particles removed by the particle separator 120 exit the device through three discard removing channels 160, 162, and 164 operating as described above.

The rotary particle separator 20 shown in FIG. 1 utilizes radial outflow geometry, and the particle separator 120 shown in FIG. 4 utilizes axial flow geometry. A third type of flow geometry is mixed flow geometry, shown in FIG. 7, which is a compromise between radial outflow geometry and axial flow geometry. A rotor 170 is shown comprising mixed flow inducer blades 172, rotor blades 174, and exducer blades 176 mounted on a rotor body 180. The rotor 170 is rotatably mounted within a housing 182, and is supplied with an air stream through an inlet shroud 184. The mixed flow inducer geometry may be used in a variety of applications, including in an environment containing only a small amount of larger particles, and is more aerodynamically efficient than other configurations, thus resulting in reduced power consumption. The radial outflow inducer design may be useful in environments containing increased quantities of larger particles, and the axial flow design may be useful in environments containing only minimal amounts of larger particles. The logic behind selection of the appropriate inducer design being dictated by the environment in which the filter device is to operate is apparent when it is noted that the larger particles may be particularly destructive of the rotor blades, and therefore it is highly desirable to remove the larger particles at the first discard removing channel location, rather than allowing them to travel along the rotor blade path.

Another alternative design consideration illustrated in FIG. 7 is the increasing diameter rotor blade design illustrated at 190. Increasing the diameter of the rotor blade 174 may prevent particles from remaining in a swirl pattern between discard removing channels. By slightly increasing the diameter of the rotor blades 174, and angling the housing 182 slightly to follow the contour of the rotor blades 174, particles which might otherwise swirl between discard removing channels will tend to tumble along to the next discard removing channel, at which point the particles will be removed. The benefits of such a design are reduced wear on the rotor blades 174 and the housing 182, and a reduction in the amount of particle breakup caused by particles continuing to remain in the rotor blade 174 area without being removed from the device.

DISCARD REMOVING CHANNEL ALTERNATE EMBODIMENTS

The tangential discard channel 110, which has been discussed above, is the simplest type of discard removing channel. It consists of a concentric groove in the housing 24 with one or more holes through the housing 24 and at a tangent to the groove located in the housing 24. The single hole shown in FIG. 8 is the tangential discard channel 110, and particles circulating between the rotor blades 32 and the housing 24 will be impelled through the tangential discard channel 110, these particles and the small amount of scavenging air accompanying them comprising the scavenging outflow 112.

Thus, it can be seen from FIGS. 1 and 8 that only three small outlet holes provide the means through which particulate matter separated from the airstream is removed from the particle separator 20. Thus, only a very small amount of scavenging air flow is removed from the airstream to carry the particulates out of the particle separator 20. More primitive rotary particle separators required a fairly large amount of scavenging air to carry the particulates out of the device, the amount of scavenging air being approximately 20 to 25% of the volume of the airstream flowing through the device. Such heavy losses would preclude the successful operation of a particle separator driven by a pressure drop, such as the filter device 120 shown in FIG. 4.

Figure 9:
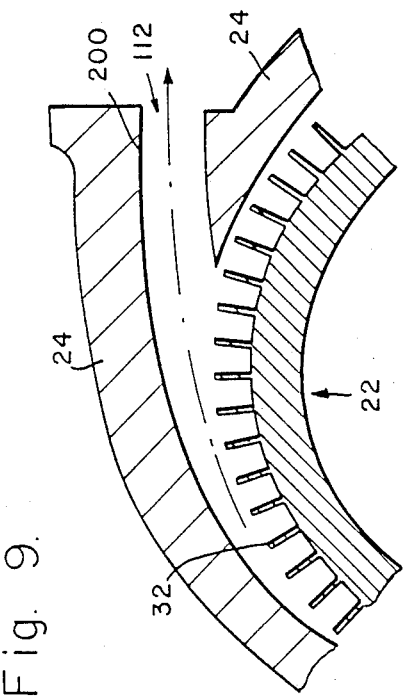
FIG. 9 is a partial cross-sectional view of the invention showing the scroll-type discard removing channel.
Figure 11:
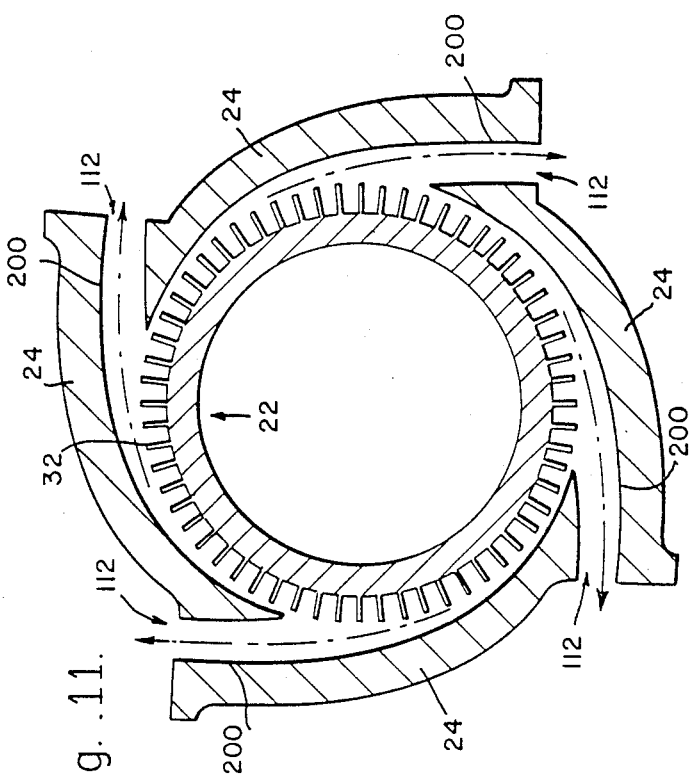
FIG. 11 is a cross-sectional view of the invention showing multiple scroll-type egress points for a single discard removing channel.
Figure 10:
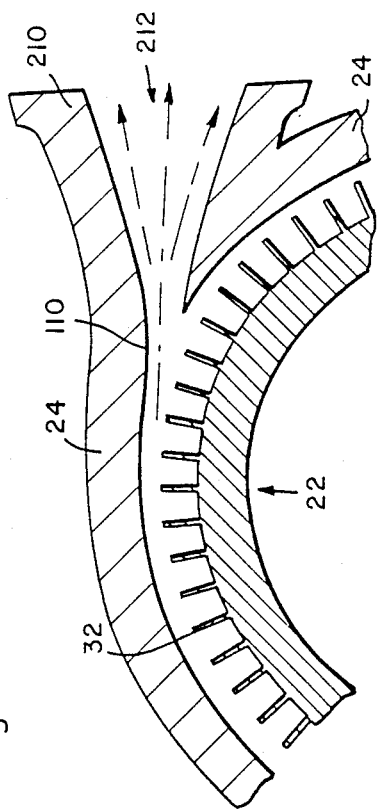
FIG. 10 is a partial cross-sectional view of the invention showing the tangential discard removing channel of FIG. 8 with a diffuser.

The design of the discard removing channel shown in FIG. 8, and its alternate embodiments shown in FIGS. 9, 10, and 11, thus represent a substantial improvement over existing designs, and would use only a small percentage of the volume of airstream as scavenging air, thus greatly reducing airflow losses In FIG. 9, a scroll-shaped discard channel 200 is illustrated. The scroll-shaped discard channel 200 is similar to the tangential discard channel 110, but the grooved portion in the housing increases in depth as it approaches the location where the scavenging outflow 112 leaves the particle separator. This configuration may be more efficient in removing particles from the grooved portion to the outlet hole portion of the channel 200. Thus, the main housing 24 more closely adjoins the rotor blades 32 at locations away from the scroll-shaped discard channel 200.

In FIG. 10, a tangential discard channel 110 is illustrated with a diffuser 210, which acts to remove the energy from the scavenging air and particles exiting the particle separator as the diffuser scavenging outflow 212. This feature permits the discard operation to occur even though the static pressure within the particle separator 20 is less than the static pressure of the environment to which the particles are removed, since the dynamic pressure maintained by the high airflow velocity within the particle separator 20 is converted to static pressure by the diffuser 210, thus raising the static pressure of the outflow 212 as it exits the particle separator 20 through the diffuser 210. Also, maintaining a lower static pressure within the particle separator 20, which is made possible by the use of the diffuser 210, means that the particle separator 20 will require less power to drive it.

FIG. 11 illustrates another alternate embodiment in which there are four scroll-shape discard channels 200 located in the main housing 24 of the rotary particle separator 20. Such an application would probably be useful only with extremely high air flow volumes, since the losses would be increased fourfold.

THE SECONDARY FLOW VELOCITY PROBLEM

Figure 12:
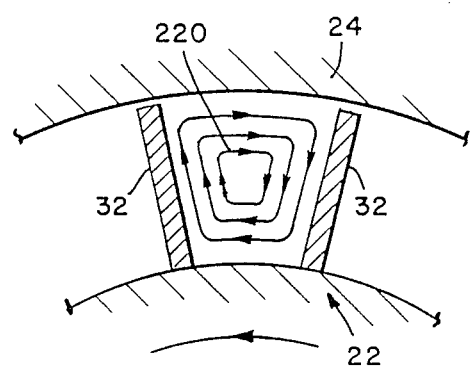
FIG. 12 is a schematic cross-sectional view of two axially extending rotor blades illustrating the secondary flow characteristics which may impede performance of the device.

The high speed rotation of the airstream through the particle separator 20 between the rotor blades 32 and the housing 24 may cause unwanted secondary flow velocities of two types-inertial type secondary flow, and frictional or viscous type secondary flow. Of these types, frictional or viscous type secondary flow is the more serious, and is illustrated in FIG. 12. The rotor 22 is rotating at high speed in the direction shown relative to the main housing 24, and this high speed rotation will cause a swirling in the area indicated as the secondary flow swirl 220. While the heavier particles will resist the secondary flow swirl 220 and be forced radially outward towards the main housing 24 where they can be removed by the discard removing channels 100, 102, and 104 (FIG. 1), the smaller and lighter particles suspended in the airstream may become entrained in the secondary flow swirl 220, thus effectively preventing their removal from the particle separator 20. In addition, this swirling will cause the particles entrained therein to move violently within the area defined by the rotor blades 32 and the main housing 24, thus possibly causing particle breakup, further hindering the removal of the particles. The present invention presents two possible solutions to the problem of secondary flow velocities.

THE BLADELESS ROTOR SOLUTION

Figure 13:
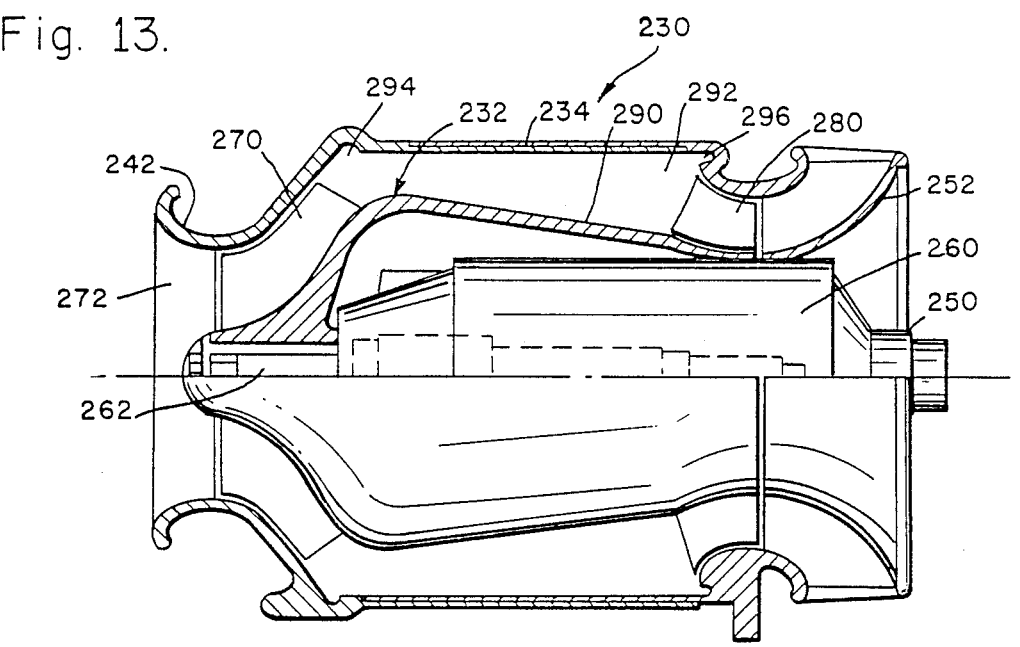
FIG. 13 is a partially cutaway view of an alternate embodiment of the invention containing no axially extending rotor blades between the inducer blades and the exducer blades, which eliminates the secondary flow shown in FIG. 12.

FIG. 13 illustrates a bladeless motor-driven particle separator 230, with a bladeless rotor 232 rotatably mounted within a housing 234, which is formed integrally with an inlet shroud 242. The bladeless rotor 232 is supported at the outlet end by a shaft carrier assembly 250, which is contained in an outlet assembly 252 mounted onto the housing 234. A motor assembly 260 is contained within the bladeless rotor 232, with the stator portion of the motor assembly 260 being non-rotatably mounted to the outlet assembly 252. The rotor portion of the motor assembly 260 is mounted on a shaft 262, which is connected to and drives the bladeless rotor 232 when the rotor of the motor assembly 260 is caused to rotate by electric current. It should be noted that the motor assembly 260 is standard in the art, and not a point of novelty with the present invention.

The bladeless rotor 232 has a number of inducer blades 270 mounted at the inlet end of the bladeless rotor 232 in a mixed flow configuration, and the airstream will enter the particle separator 230 through a number of inlet vanes 272 mounted in the inlet shroud 242. The bladeless rotor 232 also has a number of exducer blades 280 mounted at the outlet end of the rotor 232, and the airstream exits the device from the exducer blades 280 and through the outlet assembly 252.

The portion of the bladeless rotor 232 which does not contain blades is the surface area 290 between the inducer blades 270 and the exducer blades 280, which is the portion of the rotor in which the main portion of the secondary flow velocities occur if blades are present as illustrated in FIG. 12. The particular configuration of the rotor surface area 290 has been found to produce acceptable separation characteristics.

The airstream is accelerated up to the proper angular velocity by the inducer blades 270, so it will enter a swirl area 292 (defined by the housing 234 and the bladeless rotor surface area 290) with the desired angular velocity. The partculates present in the airstream will be forced by the high angular velocity to migrate to the area adjacent the housing 234, with air removed by a pair of discard removing channels 294 and 296. Most of the larger particles will exit the particle separator 230 through the first discard removing channel 294, while most of the smaller particles will exit through the second discard removing channel 296, which is located near the outlet end of the swirl area 292. The exducer blades 280 act to remove energy from the airstream before it leaves the particle separator 230 through the outlet assembly 252, and help make possible the maintenance of the high angular velocity within the bladeless rotor surface area 290.

The bladeless motor-driven particle separator 230 shown in FIG. 13, despite being slightly less efficient than the bladed version described herein, is capable of separating virtually all particles down to a 2 micron diameter in a package approximately 10 inches in diameter and 15 inches in length, with a speed less than 17,000 rpm. Since the particle separator 230 is completely self-powered and self-contained, it is ideal for use in a military application as a military vehicle cabin ventilation unit for removing particulates from the crew air supply. It is worth noting that a similar package may be easily manufactured using a bladed rotor such as that shown in the device illustrated in FIG. 1.

THE SHROUDED ROTOR EMBODIMENT

Figure 14:
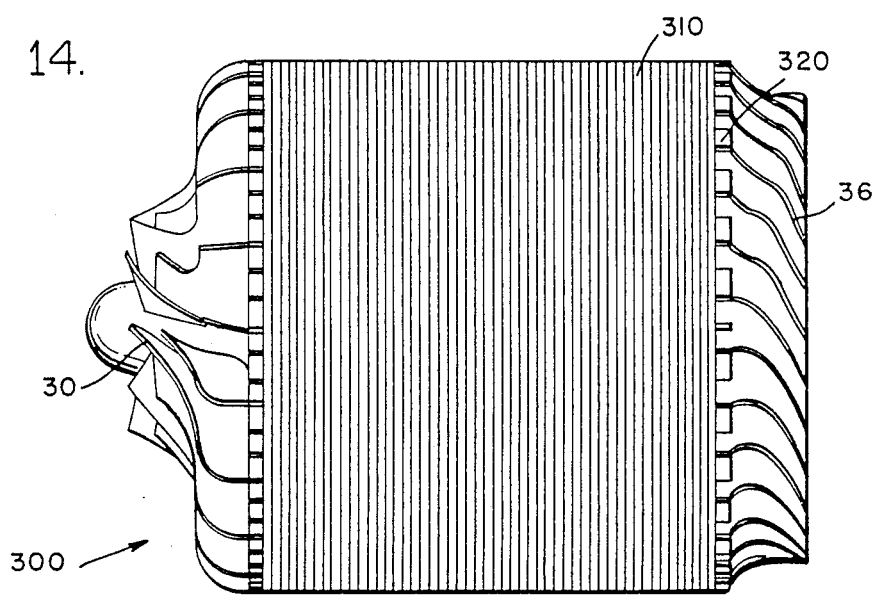
FIG. 14 is a side view of an alternative embodiment for a rotor to be used in the device shown in FIG. 1, the rotor containing a porous shroud to eliminate the secondary flow problem shown in FIG. 12.

A second solution to the secondary flow velocity problem described above is to cover the bladed portion of a rotor 300 similar to the rotor 22 of FIG. 1 with a porous shroud 310, as illustrated in FIG. 14. In designing the porosity of the shroud 310, there are two considerations. First, the porous shroud 310 must be open enough to permit the free flow of particulates migrating radially outward so that they may reach the discard removing channels and be removed from the particle separator 20; second, the porous shroud 310 must be closed enough to minimize to the extent physically possible the secondary flow swirl 220 illustrated in FIG. 12.

There are several other design considerations dictating the form of the porous shroud 310. The strength of the shroud material must be strong enough to withstand the high centrifugal force imposed at the tips of the rotor blades 320. Also, the shroud 310 must be highly resistant to clogging caused by particle collection diminishing the porosity of the shroud 310.

Several possible methods of making such a porous shroud 310 including making the shroud from a metallic wire mesh or other filamentary material such as glass fibers, or plastics. The shroud 310 can be made by tiny perforations in sheet stock made of metal or some other material. A highly controllable method of fabricating a porous shroud 310 is to wind a high strength wire tightly around the rotor blades 320 at a preselected pitch or helix angle to achieve the desired porosity. Such a method has the advantage of prestressing the shroud material so that it will not expand during rotation and migrate axially off of the rotor blades 320.

Figure 14A:
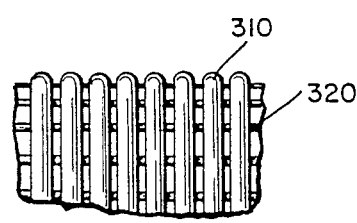
FIG. 14A is an enlarged view of a portion of the porous shroud shown on the rotor in FIG. 14.

Such a porous shroud 310 is illustrated in FIG. 14, and in the magnified sectional view of FIG. 14A. The porosity of the shroud 310 shown is 14.2%, which, by way of example, may be achieved by making the shroud 310 from 156 turns of 0.033 inch diameter wire wound around a rotor 22 with a 6 inch portion of the rotor blades 320 being wrapped (26 turns/inch). Such a design will effectively reduce secondary flow velocities and will increase the efficiency of the particle separator 20 in removing particulates between 10 microns and 2 microns from the airstream traveling through the particle separator 20, although effective porosity may vary from 5-30%.

Thus, it can be seen that the present invention will remove both large and small particles from an airstream without requiring cleaning, repair, or replacement of a filter element. The above description of the preferred embodiment of the present invention is not intended to limit the scope of the invention in any way; for example, the present invention may be used to remove particles and heavies from a liquid flowing through the device, the characteristics of the invention allowing for greater efficiency in the removal of small particles than that of a centrifuge. The particle separator disclosed is of a minimal size, weight, and cost, particularly when compared to pre-existing devices described above. The device is entirely self-contained, and is easy to manufacture as a bolt-on unit.

Such design capabilities enable the particle separator described herein to be utilized in removing dust from an intake system of an engine, in removing dust from air to be supplied to the crew of a sealed vehicle, in removing lead particles from exhaust of a gasoline engine, and in removing carbon particles from the exhaust of a diesel engine, and in removing dust from air to be supplied to the crew of a sealed vehicle. The device thereby presents highly improved performance over the pre-existing art, without presenting any of the disadvantages of that art.

What is claimed is:

1. A particle separator for removing both small and large particles from an airstream comprising:
   a cylindrical housing having an interior surface, an inlet end, and an outlet end;
   a rotor mounted rotatably about an axis within said housing, said rotor having a bladeless surface portion to minimize secondary flow swirl in said separator, said bladeless surface portion having an inlet end and an outlet end;
   an inducer portion for imparting rotational energy to said airstream as said airstream enters said housing at said inlet end of said housing, said inducer portion being adjacent to and rotating with said bladeless surface portion at the inlet end thereof;
   means for driving said rotor at high speed, a portion of said airstream between said bladeless surface portion of said rotor and said interior surface of said housing being caused to swirl around said axis at high speed by the rotation of said rotor, said large particles being forced radially outward closely adjacent to said interior surface of said housing at the inlet end of said housing, said small particles being forced radially outward closely adjacent to said interior surface of said housing near the outlet end of said housing;
   a first groove located in said interior surface of said housing at the inlet end of said housing for collecting said large particles;
   a first aperture in said housing communicating with said first groove, said first aperture allowing said large particles to be removed from said first groove to a location outside said housing;
   a second groove located in said interior surface of said housing at the outlet end of said housing for collecting said small particles;
   a second aperture in said housing communicating with said second groove, said second aperture allowing said small particles to be removed from said second groove to a location outside said housing; and
   an exducer portion for removing rotational energy from said airstream as said airstream leaves said housing at said outlet end, said exducer portion being adjacent to and rotating with said bladeless surface portion at the outlet end thereof.

2. A particle separator as defined in claim 1, wherein said driving means is an electric motor.

3. A particle separator as defined in claim 1, wherein the distance between the interior surface of said housing and said bladeless surface portion increases from a first location near said inlet end of said housing to a second location near said outlet end of said housing.

4. A particle separator for removing both small and large particles from an airstream, comprising:
   a cylindrical housing having an air inlet adapted to receive an airstream containing particles, an air outlet adapted to provide an airstream from which said particles have been substantially removed, and an interior surface between said air inlet and said air outlet;
   a rotor rotatably mounted in said cylindrical housing, said rotor including an inducer portion located in said air inlet of said housing, said inducer portion imparting rotational energy to said airstream containing particles, said rotor also including an exducer portion located in said air outlet of said housing, said exducer portion removing rotational energy from said airstream from which said particles have been removed, said rotor further including a smooth surface portion located intermediate said inducer portion and said exducer portion;

means for driving said rotor to rotate, the rotation causing said airstream to flow through said separator and said particles to migrate centrifugally outward closely adjacent said interior surface of said housing;

first means for collecting and removing said large particles closely adjacent said interior surface of said housing, said first collecting and removing means located near said air inlet and causing said large particles to go from a location closely adjacent said interior surface of said housing and said air inlet to a location outside of said housing; and second means for collecting and removing said small particles closely adjacent said interior surface of said housing, said second collecting and removing means located near said air outlet and causing said small particles to go from a location closely adjacent said interior surface of said housing and said air outlet to a location outside of said housing.

5. A method of removing both small and large particles from an airstream, comprising:

providing a cylindrical housing having an interior surface, an inlet, and an outlet, and passing said airstream through said housing;

providing a rotor rotatably mounted about an axis in said housing, said rotor having a bladeless surface portion located near said interior surface of said housing;

driving said rotor at high speed, the rotation of said bladeless surface portion of said rotor causing the portion of said airstream located between said rotor and the interior surface of said housing to swirl at high speed around the axis of said rotor, said particles being forced centrifugally outward closely adjacent said interior surface of said housing;

removing said large particles closely adjacent said interior surface of said housing and near said inlet to a location outside of said housing; and removing said small particles closely adjacent said interior surface of said housing and near said outlet to a location outside of said housing.

6. A method of removing particles from an airstream as defined in claim 5, wherein said rotor providing step substantially eliminates secondary flow swirl in said portion of said airstream located between said rotor and said interior surface of said housing.

7. A method of removing particles from an airstream as defined in claim 5, wherein said removing step utilizes only a small portion of said airstream to remove said particles to said location outside of said housing.

* * * * *